Sept. 9, 1924.  F. C. THOMPSON  1,503,308
SAFETY HOOK
Filed Jan. 8, 1924
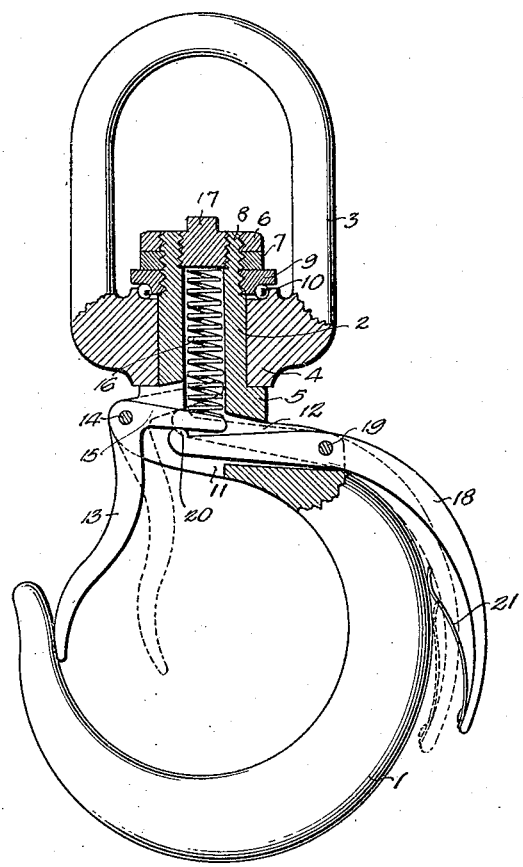
WITNESSES
INVENTOR
FRANK C. THOMPSON
BY
ATTORNEYS Patented Sept. 9, 1924.

1,508,308

UNITED STATES PATENT OFFICE.

FRANK CLYDE THOMPSON, OF SHREVEPORT, LOUISIANA.

SAFETY HOOK.

Application filed January 8, 1924. Serial No. 685,022.

*To all whom it may concern:*

Be it known that I, FRANK C. THOMPSON, a citizen of the United States, and a resident of Shreveport, in the parish of Caddo and State of Louisiana, have invented a new and Improved Safety Hook, of which the following is a full, clear, and exact description.

This invention relates to improvements in safety hooks, and more particularly to safety hooks having swivel clevises connected thereto and which are particularly adapted for use in connection with rod elevators, although, of course, the invention is broader than any particular use, an object of the invention being to provide a hook of this character which absolutely and positively prevents possibility of accidental disconnection between the hook and the part with which it is engaged.

A further object is to provide a hook of this character in which the keeper is normally held in closed position by spring pressure and can be manually moved inwardly with relation to the hook to permit disengagement of the hook from the member with which it is connected.

A further object is to provide a hook of this character which will be strong, durable and efficient and which will result in the preventing of accident and injury and damage incident thereto.

With these and other objects in view, the invention consists in certain novel features of construction and combinations and arrangements of parts which will be more fully hereinafter described and pointed out in the claims.

The accompanying drawing is a view partly in elevation and partly in longitudinal section illustrating my improved safety hook.

1 represents the hook proper, which is formed with an integral tubular cylindrical shank 2 constituting a journal on which a clevis 3 has rotary mounting. The bearing portion 4 of the clevis 3 rests against an annular shoulder 5 on the shank and is held in operative position thereagainst by means of lock nuts 6 and 7 which are screwed on to the exteriorly threaded outer end 8 of the shank and against a bearing ring 9. This ring 9 and the bearing portion of the clevis 3 are made with opposing raceways for ball bearings 10 so that the connection between the clevis and the hook is rendered anti-frictional to allow the desired pressure of engagement and strength of connection without unduly binding the clevis against rotary movement.

That portion of the hook 1 adjacent the shank 2 is formed with a recess portion 11 and a slot 12 communicating therewith.

13 represents the keeper of my improved safety hook. This keeper 13 is pivotally connected to the hook 1 by means of a rivet or pin or other suitable connection 14 extending across the recess 11, and it will be noted that to release this keeper it must be swung inwardly so that by no possibility can any pressure from within the hook force the keeper outwardly as its length is such as to engage the hook and prevent possibility of this movement.

At the pivoted end of the keeper 13 an integral finger 15 is formed on the keeper and is engaged by a coil spring 16 located within the bore of the tubular shank 2 to exert downward pressure on the finger and hold the keeper in normal position. A screw-threaded plug 17 is screwed into the threaded upper end of the bore of shank 2 and forms an abutment for the spring and permits a certain amount of adjustment, as desired.

To release the keeper from its normal, closed position, I provide a hand lever 18 which at its inner end projects through the slot 12 and is pivoted between its ends by means of a pin, rivet, bolt, or any other suitable device, 19 projected through the hook 1 and across the slot 12. The inner end of this lever 18 is preferably rounded, as shown at 20, and engages under finger 15; and a flat spring 21 is connected to the free outer end of the lever 18 and bears against the hook 1 and functions to hold the lever in normal position.

As indicated in full lines in the drawing, the parts are in normal position, so that assuming the hook to be in engagement with a link or other part, accidental disconnection is prevented. When it is desired to release the hook, it is necessary to press the outer end of the lever 18 inwardly to the dotted line position, which movement will cause the keeper 13 to swing inwardly to its dotted line position, as shown in the drawing, and allow a disconnection or a connection of the hook with a part to which it is to be engaged.

Various slight changes and alterations might be made in the general form of the parts described without departing from my invention and, hence, I do not limit myself to the precise details set forth but consider myself at liberty to make such changes and alterations as fairly fall within the spirit and scope of the appended claims.

I claim:—

1. A device of the character described, comprising a hook, a keeper normally in position across the entrance of the hook, and a hand lever independent of the keeper pivotally connected to the hook and adapted to move the keeper to its releasing position.

2. A device of the character described, comprising a hook, a keeper pivotally connected to the hook, a finger on the keeper, a spring engaging the finger and holding the keeper in normal, closed position, and a hand lever pivotally connected to the hook to engage under the finger.

3. A device of the character described, comprising a hook having a recess and a slot engaging therewith in one portion of the hook, a keeper pivotally secured in the recess and normally positioned across the entrance of the hook, a finger fixed to the keeper, a spring engaging the finger and holding the keeper in normal position, a lever projecting through the slot and at one end engaging under the finger, a device projecting across the slot and through the lever and pivotally connecting the lever and hook, and a spring between the outer free end of the lever and the hook.

4. A device of the character described, comprising a hook, a tubular shank on the hook constituting a journal, a clevis having rotary mounting on the shank, lock nuts screwed on the outer end of the shank, a bearing ring on the shank, anti-friction bearings between the ring and the clevis, a keeper pivotally connected to the hook, a finger on the keeper, a screw-threaded plug in the outer end of the shank, a coil spring in the shank between the plug and the finger, and a hand lever pivotally connected to the hook and engaging under the finger.

FRANK CLYDE THOMPSON.